United States Patent Office 3,506,161
Patented Apr. 14, 1970

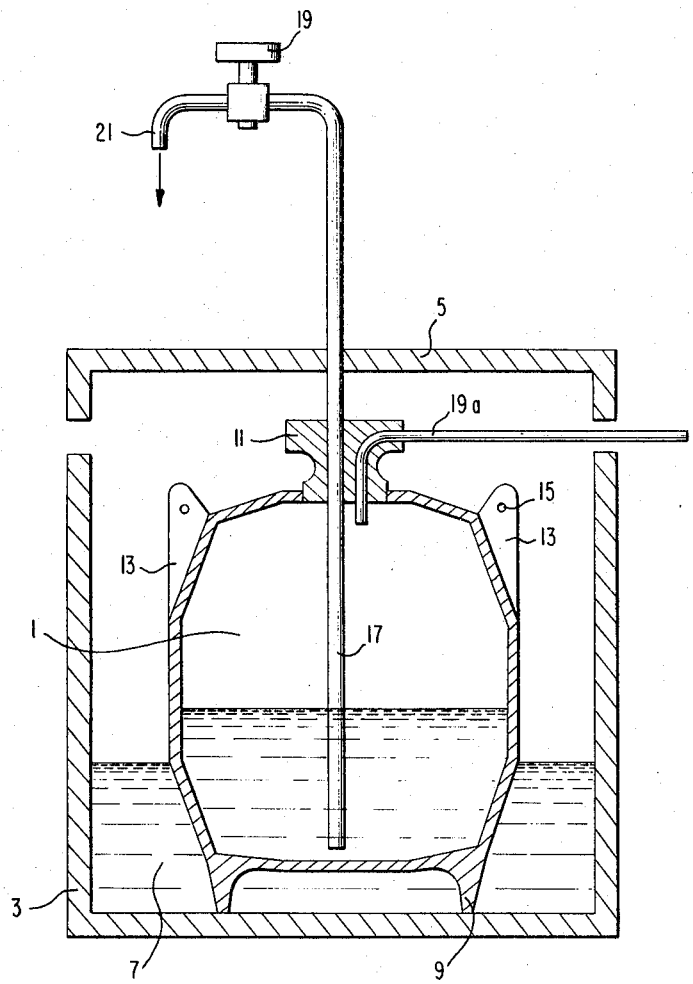

3,506,161
APPARATUS FOR DISPENSING CARBONATED BEVERAGES
Guy Saint-Dizier, 40 Rue de la Balance, Toulouse, France
Filed Nov. 25, 1966, Ser. No. 596,995
Claims priority, application France, Nov. 24, 1965, Patent 1,457,066
Int. Cl. B67d 1/04
U.S. Cl. 222—183          1 Claim

ABSTRACT OF THE DISCLOSURE

A metal pressure vessel is disposed in a substantially larger casing and is supported on legs that space it above the bottom of the casing so that a cooling fluid can circulate under the bottom of the vessel. Handling lugs in the form of upright fins are provided at the top of the vessel, and these also serve as heat transfer members. The fins and the legs are alternately spaced so that a plurality of the vessels will nest.

---

The present invention relates to apparatus for dispensing carbonated beverages, more particularly of the type which includes means for cooling the carbonated beverage.

The present invention is applicable to the dispensing of a wide variety of carbonated beverages, but will be described and illustrated by way of example in connection with the dispensing of beer.

In the dispensing of carbonated beverages such as beer from barrels or casks, problems have arisen as to how to cool the beer. One way of cooling the beer is by passing it through a cooling coil disposed between the barrel and the dispensing outlet. However, if the flow of beer through the coil is only intermittent, as is characteristic of establishments where not much beer is served, then the beer will be cooled either too much or too little, which can result in breakage of the equipment by thermal shock, or in the production of excessive foam. Also, such systems are difficult to clean.

It has also been proposed to store the barrels in refrigerating chambers before and during dispensing of the beer, but the cost of building and operating such refrigerating installations is excessive. Also, cooling by this method is slow.

Accordingly, it is an object of the present invention to provide apparatus for dispensing carbonated beverages, in which complicated structure such as cooling coils is eliminated.

Another object of the present invention is the provision of apparatus for dispensing carbonated beverages, in which cooling of the beverage to a desired level of refrigeration will be swift and the retention of carbonations in the dispensed beverage will be desirably high.

Finally, it is an object of the present invention to provide apparatus for dispensing carbonated beverages which will be relatively simple and inexpensive to manufacture, easy to install, maintain and operate, and rugged and durable in use.

Other objects and advantages of the present invention will become apparent from a consideration of the following description, taken in connection with the accompanying drawing, which is an elevational cross-sectional view of the apparatus according to the present invention, somewhat schematically rendered for simplicity of illustration.

Referring now to the drawing in greater detail, there is shown a pressure vessel for a carbonated beverage, in the form of a beer barrel 1 of a highly heat-conductive metal such as aluminum or the like. Barrel 1 is disposed within a casing 3 that has a removable cover 5. Casing 3 is substantially larger than barrel 1, so that the side walls of casing 3 are spaced from barrel 1 a substantial distance in all directions. A cooling material 7, preferably in liquid phase, is disposed in casing 3 and surrounds barrel 1 on its sides and bottom to cool the beer in barrel 1 by indirect heat exchange through the metal side walls of barrel 1.

To facilitate this heat exchange, barrel 1 is supported on spaced legs 9 that depend from and are integral with the lower edges of the barrel. These legs 9 space the bottom wall of the barrel 1 above the bottom wall of casing 3 to permit the cooling liquid 7 to circulate freely beneath the barrel so as to cool the bottom wall of the barrel and speed the cooling of the contents of the barrel. Cooling liquid 7 can have any desired composition, and may for example be ice water or a synthetic refrigerant which is maintained cold by an external refrigeration apparatus (not shown). However, it is preferred that the simplest possible construction be selected, and for this purpose it is preferred that a liquid containing some solid coolant such as water ice or solid carbon dioxide be selected.

Barrel 1 is a sealed pressure vessel, and it may be closed by a removable closure as at 11, or by a bung or other closure (not shown) in its bottom wall. Barrel 1 may have any desired shape, and may be square or otherwise polygonal, or circular, and its lower portion may be tapered polygonally or conically, as desired.

Adjacent its upper side portions, barrel 1 carries a plurality of integral handling lugs 13 which are spaced apart about the periphery of the barrel and are of metal and are integral with the material of the barrel. They may be formed in one piece from the metal of the barrel, or may be attached by welding or rivetting or soldering or other conventional methods for bonding metal to metal. These handling lugs 13 are provided with holes 15 therethrough for the reception of handling or hoist line equipment (not shown) so as to facilitate handling the barrel when full.

The lugs 13 also serve as cooling fins, and are disposed in vertical planes. The lugs 13 and the legs 9 are offset from each other around the periphery of the barrel, so that a plurality of barrels can nest when stacked coaxially. In this way, the lugs 13 interfinger with the legs 9 and these projections do not interfere with each other, but instead improve the stability of the stack of containers.

The legs 9 thus perform a unique double function in that they space the pressure vessel above the bottom wall of the casing so that the bottom of the barrel 1 may be cooled by the cooling medium in the casing, and they also serve as stacking aids for a plurality of barrels. The fin-like lugs 13 also have a unique dual function: they serve as heat exchange fins for the contents of the barrel, and they also serve as stacking aids in cooperation with legs 9.

It is thus possible to fill the casing 3 with cooling liquid to the level of its upper edge, which is disposed above the lugs 13. For this purpose, the casing 3 is made liquid tight at least to this level.

Means are provided for dispensing liquid from barrel 1, in the form of a tube 17 that extends into barrel 1 almost to the bottom thereof, and thence through closure 11 and cover 5 to a convenient location outside the casing 3. Tube 17 is provided with a dispensing valve 19 by which the flow of beer or other carbonated beverage is regulated through the dispensing nozzle 21. Means are provided for maintaining the interior of barrel 1 under superatmospheric pressure, in the form of a tube 19a that extends through closure 11 only a short way into the interior of barrel 1, and extends outside of casing 3 in any desired fashion, to a source (not shown) of air or carbon dioxide under superatmospheric pressure so that the interior of barrel 1 can be selectively pressurized to any desired degree. The tube 19a is shown extending between the upper edge of casing 3 and the lower edge of cover 5; but it will of course be understood that this is merely a schematic showing which indicates that the tube 19a, as well as the tube 17, can pass through casing 3 or cover 5 in any convenient manner.

In view of the foregoing disclosure, therefore, it will be evident that all of the initially-recited objects of the present invention have been achieved.

Although the present invention has been described and illustrated in connection with a preferred embodiment, it is to be understood that modifications and variations may be resorted to without departing from the spirit of the invention, as those skilled in the art will readily understand. Such modifications and variations are considered to be within the purview and scope of the present invention as defined by the appended claim.

Having described my invention, I claim:

1. A carbonated beverage dispenser, comprising a casing, a metal presure vessel for the beverage disposed within the casing with substantial clearance to permit a cooling medium to occupy at least some of the space between the vessel and the casing, the pressure vessel having legs on which it rests upright on the bottom of the casing and by which the pressure vessel is spaced above the bottom of the casing with substantial clearance between the bottom of the casing and the bottom of the pressure vessel to permit circulation of a cooling medium between the bottom of the pressure vessel and the bottom of the casing, means for withdrawing the beverage under pressure from the pressure vessel comprising a conduit extending through the top of the pressure vessel and terminating in the bottom of the pressure vessel, and means for introducing a gas under pressure to the interior of the pressure vessel to force liquid out of the pressure vessel through said withdrawing means and comprising a conduit extending through the top of the pressure vessel and terminating in an upper portion of the pressure vessel, the bottom of the pressure vessel being downwardly inclined toward its center to define a lowermost portion within which the lower end of said withdrawing conduit is disposed, thereby to ensure maximum discharge of carbonated beverage from the pressure vessel, the casing having an upper edge disposed at least as high as most of the height of the pressure vessel, said gas introduction means and beverage withdrawing means extending above said upper edge of the casing, and a removable cover for the casing, said withdrawing conduit extending upwardly through said cover, said gas introduction means extending between the upper edge of the casing and the lower edge of the cover.

References Cited

UNITED STATES PATENTS

| 1,548,430 | 8/1925 | Ashley | 62—400 X |
| 81,814 | 9/1868 | Nuellens et al. | 222—146 X |
| 2,116,622 | 5/1938 | Eisenmenger | 222—131 X |
| 2,240,791 | 5/1941 | Leesberg | 222—397 X |
| 3,143,242 | 8/1964 | Mulder | 220—97 X |
| 3,308,636 | 3/1967 | Schaaf | 222—146 X |

FOREIGN PATENTS 499,172  1/1954  Canada.

ROBERT B. REEVES, Primary Examiner

N. L. STACK, Assistant Examiner

U.S. Cl. X.R.

222—400.7; 62—400